United States Patent
Helfre et al.

(10) Patent No.: US 9,008,636 B2
(45) Date of Patent: Apr. 14, 2015

(54) METHOD FOR DUAL SIM DUAL STANDBY TERMINAL

(75) Inventors: Vincent Helfre, Lund (SE); Hans-Christian Goranson, Copenhagen (DK)

(73) Assignee: ST-Ericsson SA, Plan-les Ouates (CH)

( * ) Notice: Subject to any disclaimer, the term of this patent is extended or adjusted under 35 U.S.C. 154(b) by 53 days.

(21) Appl. No.: 13/876,697

(22) PCT Filed: Sep. 6, 2011

(86) PCT No.: PCT/EP2011/065371
§ 371 (c)(1),
(2), (4) Date: May 21, 2013

(87) PCT Pub. No.: WO2012/041663
PCT Pub. Date: Apr. 5, 2012

(65) Prior Publication Data
US 2013/0303139 A1 Nov. 14, 2013

Related U.S. Application Data

(60) Provisional application No. 61/411,680, filed on Nov. 9, 2010.

(30) Foreign Application Priority Data

Oct. 1, 2010 (EP) .................................... 10185477
Oct. 1, 2010 (EP) .................................... 10306079

(51) Int. Cl.
*H04W 88/02* (2009.01)
*H04W 52/02* (2009.01)
H04W 4/16 (2009.01)
*H04W 8/18* (2009.01)

(52) U.S. Cl.
CPC .............. *H04W 52/028* (2013.01); *H04W 4/16* (2013.01); *H04W 8/18* (2013.01)

(58) Field of Classification Search
USPC ........... 455/417; 715/765; 726/34; 725/9, 12, 725/32
See application file for complete search history.

(56) References Cited

U.S. PATENT DOCUMENTS 6,603,982 B1 8/2003 Muller
6,889,059 B1 5/2005 Fragola
(Continued)

FOREIGN PATENT DOCUMENTS

KR 10-2008-0058613 A 6/2008

OTHER PUBLICATIONS

International Search Report issued in corresponding International application No. PCT/EP2011/065371, mailing Oct. 4, 2011.
(Continued)

*Primary Examiner* — Diane Mizrahi
(74) *Attorney, Agent, or Firm* — Patent Portfolio Builders PLLC

(57) ABSTRACT

The method of operating a multiple SIM phone, the phone being connectable to at least first and second SIM applications includes configuring the phone and operating the phone. The phone is configured by selecting a dual standby mode with a specific master configuration of the first SIM application, registering the second SIM application on a wireless network, activating a call forwarding function from the second SIM application to the first SIM application, registering the first SIM application on the wireless network. The phone is operated by processing standby functions of the first SIM application, receiving any incoming call via the first SIM application, and handling requests for outgoing calls from the first SIM application.

12 Claims, 2 Drawing Sheets

(56) References Cited

U.S. PATENT DOCUMENTS

2009/0131054 A1    5/2009   Zhang
2012/0135715 A1*   5/2012   Kang et al. .................. 455/412.1
2012/0231802 A1*   9/2012   Ngai ............................ 455/450

OTHER PUBLICATIONS

Written Opinion issued in corresponding International application No. PCT/EP2011/065371, mailing Oct. 4, 2011.

* cited by examiner

METHOD FOR DUAL SIM DUAL STANDBY TERMINAL

TECHNICAL FIELD

This invention involves the mobile communication field, especially the mobile phone that can support two Subscriber Identity Module (SIM) cards and allow a dual standby mode.

BACKGROUND TECHNOLOGY

Dual SIM telephones are telephones that can hold two SIM cards. Some models are only active on one network at a time and have to be restarted to switch to the other network. They are called DSSS which is the acronym of "Dual SIM single standby".

Some dual SIM mobile phones can be active on two networks simultaneously in standby mode. In dedicated mode, the phone is only active on the network on which the call is going on. They are called DSDS which is the acronym of "Dual SIM dual standby".

The Dual SIM telephones are particularly useful in two situations:

For users commuting between two countries, they can have one operator in each country to call with the cheapest rate.

For users having a professional number and a private number.

The Korean application KR2008058613A disclose a dual mode terminal. The mobile phone uses the two radio stacks reaching signal processing functions and standby functions.

Various other solutions exist for DSDS. Some use two radios, or have two active stacks using the same radio alternatively.

A problem with such solutions is that they have larger power consumption than a single SIM or DSSS phone. This is due to duplication of the signal processing functions and the standby functions. Hence, battery time can be an issue for such phones. As a consequence batteries are typically bigger and/or autonomy is typically shorter.

Thus, one problem of existing solutions is that dual SIM phones are bigger than other phones (due to their larger battery) and/or that battery time is shorter.

Hence, there is a need for methods for dual SIM phones that reduces the power consumption.

SUMMARY

One object of the invention is to overcome at least some of the inconveniences of the state of the art. Some embodiments of the invention permits to improve the battery time and/or to reduce the size of a dual SIM card phone.

A method of operating a call forward function on a dual SIM dual standby phone according to some embodiments of the invention comprises:
  a first set of configuration steps in order to activate a master/slave configuration and a call forwarding service on the mobile phone;
  phone nominal operations which allows to receive any incoming calls dedicated either to the master SIM or to the slave SIM and outgoing calls from the master SIM card;
  phone specific operations which permits outgoing calls from the slave SIM card.

Embodiments of the invention are useful in the case of one person using a dual SIM phone to combine use of his professional number and his private number on the same phone.

A subscriber can typically use the call forward service to forward a call intended for his number of a first SIM card to another number of the second SIM card. This service is generally free if both numbers belong to the same operator. If they do not belong to the same operator, the call forward may be charged as a communication.

In a first aspect of the invention, the method of operating a multiple SIM phone, the phone being connectable to at least first and second SIM applications (SIMA, SIMB), comprises:
  configuring the phone by:
    selecting a dual standby mode with a specific master configuration of the first SIM application (SIM A);
    registering the second SIM application (SIM B) on a suitable cell of a wireless network;
    activating a call forwarding function from the second SIM application to the first SIM application;
    registering the first SIM application on a suitable cell of the wireless network;
  operating the phone by:
    processing standby functions of the first SIM application;
    receiving any incoming call via the first SIM application; and
    handling requests for outgoing calls from the first SIM application.

In some embodiments of the invention, the phone is adapted to implement a dual SIM dual connection mode allowing the configuration of the first SIM application as a master application and the second SIM application as a slave application.

Advantageously, in a second embodiment of the invention, the phone is adapted to implement a dual SIM dual standby mode allowing the configuration of the first SIM application as a master application and the second SIM application as a slave application.

In some embodiments, the method further comprises:
  handling a request for an outgoing call from the second SIM application by:
    switching operations from the first SIM application to the second SIM application;
    automatically switching back operations from the second
  SIM application to the first SIM application at the end of the outgoing call from the second SIM application.

In some embodiments, the request for an outgoing call from the second SIM application is initiated by a user activation on a phone interface.

In some embodiments, the first step of selection of the dual standby mode with a specific master configuration of the first SIM application automatically declare the second SIM application as a slave.

In some embodiments, the at least first and second SIM applications comprises at least first and second SIM cards and wherein the phone is connectable to the at least first and second SIM cards by comprising at least a first and second SIM card slot adapted to hold the first and second SIM card respectively.

In a second aspect of the invention, a computer program product comprises a computer readable medium, having thereon a computer program comprising program instructions, the computer program being loadable into a data-processing unit and adapted to cause the data-processing unit to execute any of the steps of the method when the computer program is run by the data-processing unit.

In third aspect of the invention, a circuitry for a mobile phone is connectable to at least first and second SIM applications and comprises an interface adapted to allow a master/ slave configuration of SIM applications and a call forwarding configuration which permits to forward incoming calls aimed to a slave SIM application to a master SIM application.

Advantageously, the circuitry comprises also at least a first signal processing device associated with the master and the slave SIM application, the signal processing device adapted to perform signal processing functions in emission and reception modes and standby functions in standby mode, wherein the activation of the master/slave SIM applications configuration and the call forwarding configuration involves the activation of only signal processing functions regarding the master SIM application in standby mode.

In some embodiments, the circuitry further comprises a digital signal processor adapted to perform the standby functions and a baseband radio resource control unit adapted to control a configuration, the standby functions comprising:
- a scanning function which allows search of the cell offering a suitable signal;
- a decoding function which allows decoding of received signals;
- a reading function which allows reading of a paging signal at a paging instant to enable reception of an incoming call.

In some embodiments, the circuitry is adapted to handle a request for an outgoing call from the slave SIM application by:
- switching operations from the master SIM application to the slave SIM application;
- automatically switching back operations from the slave SIM application to the master SIM application at the end of the outgoing call from the slave SIM application.

In some embodiments, the at least first and second SIM applications comprises at least first and second SIM cards and wherein the phone is connectable to the at least first and second SIM cards by comprising at least a first and second SIM card slot adapted to hold the first and second SIM card respectively.

In fourth aspect of the invention a mobile phone comprises the circuitry.

In some embodiments, the phone is adapted to implement a dual SIM dual connection mode allowing the configuration of the first SIM application as a master application and the second SIM application as a slave application.

In some embodiments, the phone is adapted to implement a dual SIM dual standby mode allowing the configuration of the first SIM application as a master application and the second SIM application as a slave application.

Embodiments of the invention are described herein with reference to dual SIM phones. However, it is to be noted that embodiments of the invention are equally applicable to situations with more than 2 SIMs.

Similarly, embodiments of the invention are described herein with reference to DSDS phones. However, it is to be noted that embodiments of the invention are equally applicable to other scenarios where a dual/multiple standby function applies, for example, to standby mode of a Dual SIM card Dual Call phone.

Furthermore, embodiments of the invention are described herein with reference to SIM card slots and SIM cards. However, it is to be noted that embodiments of the invention are equally applicable to situations with other SIM-solutions, e.g. virtual SIM. More generally, references to SIM may be perceived as a SIM application, which embraces the case of classical, physical SIM cards and any Universal Subscriber Identity Module (USIM) such as virtual a SIM.

BRIEF DESCRIPTION OF THE DRAWINGS

These and other aspects of the invention will be apparent from and elucidated with reference to the embodiments described hereafter with reference being made to the drawings in which.

DETAILED DESCRIPTION

There are several steps required to camp on a cell which involves active standby functions consuming power from the battery as:
- scanning function which permits to camp on the cell with the best signal;
- decoding function which permits to read the system information;
- reading function which permits to read the paging at regular interval to be able to receive an incoming call.
- For example, in the 3rd Generation Partnership Project (3GPP) specification active standby functions include: RSSI Received Signal Strength Indicator (RSSI) scan, synchronization (through Fundamental Channel (FCH) and Synchronization Channel (SCH) reading), system information reading, paging reading, etc.)

The scanning function is used for obtaining average power in one of the two signal bandwidths of the scanner. Accordingly, measures are taken to ensure high accuracy and stability of the results.

A RSSI from the network is received by the mobile. This value is used to weigh the signal strength comparison between the Cellular Digital Packet Data (CDPD) channel in the current cell versus that of the indicated adjacent cell.

This RSSI Hysteresis value instructs the mobile devices to stay on its current channel until the difference between the current channel and the adjacent channel exceeds this broadcast value.

The decoding function enables the mobile phone to synchronize to a network base station (in time and frequency) and then decode system information from that base station. For example in Global System for Mobile communication (GSM): Time Division Multiple Access (TDMA) frame number, base station identity code, frequency hopping messages and any messages that allow the description of the current channel structure.

The reading function enables the phone to read the paging channel transmitted from the network basis stations.

The paging channel typically contains signalling messages transmitted from the network to an idle mobile, in case the idle mobile receives an incoming call. A mobile in idle mode typically wakes up at regular intervals (e.g. 1.4 s) to listen to the paging channel.

To summarize, an example mobile terminal typically always goes through the RSSI scan, synchronization to a base station, system information reading, registration to the network (though which the mobile is assigned an identity which will be used when paging it) and finally paging configuration.

These functions are typically supported by a signal processing stack which analyzes all data received from a base station of the network.

In a typical DSDS phone, all these actions are duplicated, reducing significantly the standby time.

Figure 1:
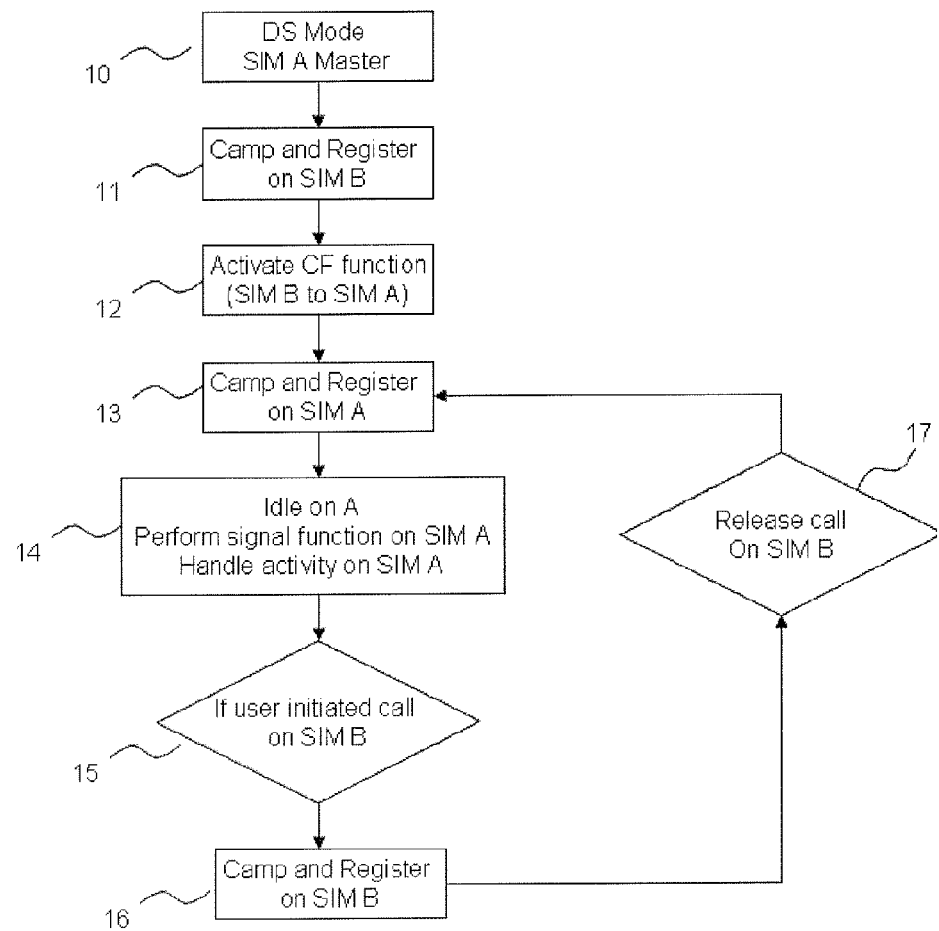
FIG. 1: is a flow diagram which illustrates the main operations of an example method according to some embodiments of the invention.

FIG. 1 illustrates one embodiment of the method of the invention which comprises different steps permitting activation of a call forward function on a multiple SIM phone.

In one example of one embodiment of the invention the multiple SIM phone comprises a two SIM phone. It is called a dual SIM phone.

The call forward function of the invention can be supported in this embodiment by a dual standby mode (as e.g. in DSDS and DSDC) or in another embodiment by a dual connection mode (as e.g. in DSDC) by a two card slots phone adapted to hold two SIM cards.

By utilizing call forwarding, the dual SIM phone according to some embodiments of the invention only have to perform the idle mode functions for one SIM and thereby the power consumption is reduced.

This embodiment comprises four steps of phone configurations allowing nominal operations and a specific operation depending on the user's requests.

The first step 10 allows a selection of the dual standby mode of the phone. The selection of this mode includes a master/slave configuration of the two SIM cards of the phone. This step is called "DS mode SIM A Master" in FIG. 1.

In another embodiment comprising multiple SIM cards, the master/slave configuration allows to define one master card and several slave cards.

In one example of one embodiment of the invention, the selection of the first SIM card, named SIM A, defines the first card as the master SIM card. In this example, the second SIM card, named SIM B, becomes automatically the slave SIM card.

The master/slave configuration defines that the incoming calls to the slave SIM card will be forwarded to the master SIM card.

The user in this embodiment of the invention can choose either SIM A or SIM B as master SIM card.

This mode is called dual SIM pseudo dual standby mode. It means that SIM B is not really in standby mode because of the non-operation of standby functions which are not realized in order to consume less power. Nevertheless, the mobile phone is able to manage any incoming communications dedicated to SIM A or SIM B due to the call forwarding function.

The Chinese application CN101252730A describes a dual SIM mobile phone allowing a call forwarding service from one SIM to the other. But this proposal does not provide any mean to chose the SIM card to initiate the outgoing call from.

So the benefit from the dual SIM card configuration is only for incoming communications. But the mobile phone does not allow the configuration of outgoing call from the slave SIM card.

For the rest of the description, we consider the example in which SIM A is the master SIM card and SIM B is the slave SIM card.

The second step 11 of the example method in FIG. 1 allows the registration of the slave SIM card, named SIM B in the example, to the wireless network operator. The registration of the slave SIM card allows the phone to camp on SIM B and find a suitable cell of the network. This step is called "Camp and register on SIM B" in FIG. 1.

A third step 12 allows the slave SIM card to activate the call forwarding function to the wireless network operator. This step is called "Activate CF function (SIM B to SIM A)" in FIG. 1.

In one embodiment of the invention, the call forward function is activated at the phone startup. In another embodiment of the invention, the call forward function can be activated at any time after phone startup, e.g. by a user or by automatic functionality of the phone. One advantage of this last case is that it enables non-interference with other user interactions and/or to minimize the power consumption when a low battery indication is raised.

In this last embodiment, a preliminary step before the first step permits to allow the phone to camp on SIM A and SIM B. In this case the second step is not necessary.

The call forwarding functionality is realized through layer 3 messaging. In the 3GPP standard (GSM, WCDMA, LTE), this is done via Supplementary Services (SS) protocol (TS24.010), and Call forwarding is specified in the TS23.082.

The fourth step 13 is the final configuration step. The phone registers the master SIM card, SIM A, to the wireless network operator. This step is called "Camp and register on SIM A" in FIG. 1.

In the case where the call forward function is not activated at the phone startup, the fourth step allows to release SIM B.

At the end of the fourth step, the two SIM cards are registered to the network and the call forwarding function is activated. That means that incoming and outgoing calls for SIM A are handled in a nominal way and incoming calls for SIM B are received thanks to the activation of the call forwarding function.

The example method according to some embodiments of the invention defines nominal operations which correspond to a nominal state. In this state the phone is still in the dual SIM pseudo dual standby mode. This step 14 is called "Idle on A, perform signal function on SIM A, handle activity on SIM A" in FIG. 1.

The nominal state allows the phone to camp on the master SIM card, SIM A. In this nominal state any call originated from SIM A or terminated call to SIM A is handled normally, as a single SIM phone would do on SIM card. The nominal state allows nominal operations as standby functions.

The standby functions are active in standby time and comprises at least:
  a scanning function which allows the search of a cell offering the best signal;
  a decoding function which allows the decoding of signal entrance of the phone;
  a reading function which allows the reading of the paging at regular interval to be able to receive an incoming call.

When the phone is not in standby, the nominal operations comprises a reception function which permits the reception of any incoming call aimed at the slave or the master SIM card.

The nominal operations also comprises an emission function which allows outgoing calls from the master SIM card.

So the nominal operations comprises both functions active in standby ("idle mode") and during calls (e.g. "connected mode").

The example method according to some embodiments of the invention allows a specific operation when the user wants to initiate a call from SIM B. This step 15 is called "If user initiated call on SIM B" in FIG. 1.

The operation comprises a preliminary configuration step from the phone interface or any switch button that permits the phone to camp on SIM B. This operation can be realized by a user operation.

After the switching operation via a phone interface, the mobile phone registers to the network and establishes a dedicated connection for the call on the SIM B. This step 16 is called "camp and register on SIM B" in FIG. 1.

Moreover, in case where the master and the slave SIM card are registered with the same public land mobile network, named PLMN, the same serving cell may be used from the two SIM cards.

In case of SIM A and B share the same PLMN, a serving cell can be easily found by the slave SIM card after the switching step because of the possibility to use the same serving cell.

If SIM A and SIM B do not share the same PLMN, a new registration of the slave SIM card permits the phone to camp on SIM B and find a suitable cell of the network.

The call from SIM B can be realized after this preliminary configuration step and when the call is released, the phone camps back on SIM A. A get back function permits at the end of any user initiated call from the second SIM to return to the nominal state and camp on SIM A.

When the user initiates a call on SIM B, SIM B needs to go active that is to say that SIM B camps and registers on a suitable cell of the network. This switch operation is facilitated in that all measurements made by SIM A (as exemplified in steps 13 and 14) can be directly used by SIM B (in case they belong to the same PLMN).

When SIM B is no longer active, the state where only SIM A performs measurements required in nominal state mode is resumed.

A get back function to the nominal state at the end of any user initiated call from the second SIM card permits to return automatically in nominal state. This get back function is illustrated on the flowchart in FIG. 1 with step 17 called "release on SIM B" and step 13 "Camp and register on SIM A".

One advantage of the example method according to some embodiments of the invention is that in case a call on SIM B is received, it is transparent for the user because the network forwards it internally to SIM A.

Another advantage of some embodiment of the invention is that the master SIM card performs measurements required in idle mode corresponding to the standby functions. Thus, less power is consumed than if both SIM have to do measurements.

Yet another advantage of some embodiments of the invention is to permit the phone to be (at least nearly) as efficient in terms of battery drain as a single SIM phone. In some situations, embodiments of the invention may encourage the user to have the same operator for both SIM since that may reduce the cost for the call forwarding.

Figure 2:
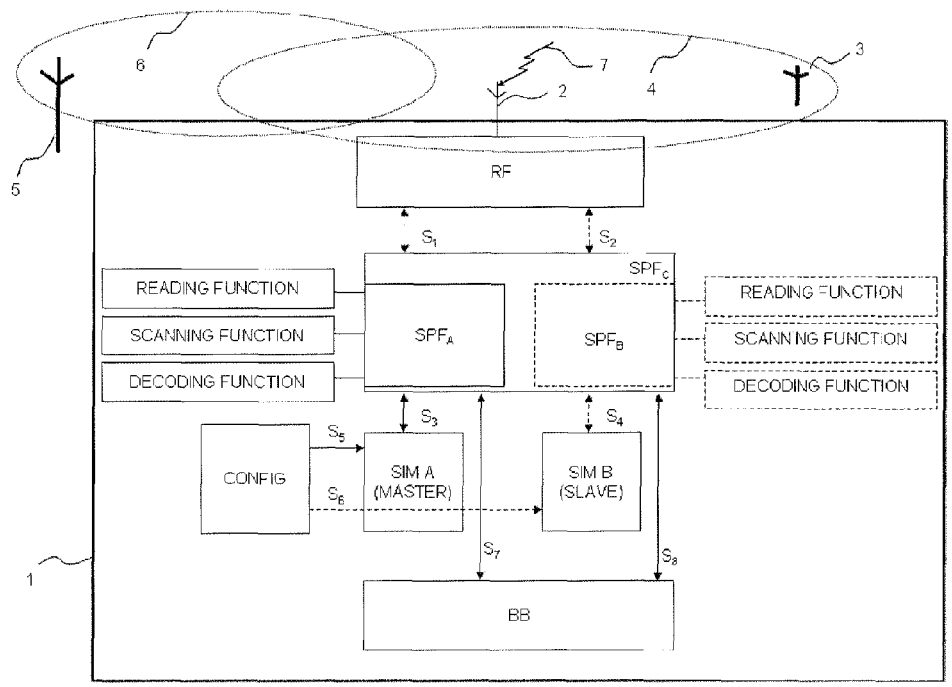
FIG. 2: is a schematic block diagram which illustrates an example of mobile phone devices which allow dual SIM pseudo dual standby mode according to some embodiments of the invention.

The FIG. 2 illustrates a mobile phone 1 comprising an antenna 2 and an RF component RF able to demodulate incoming signals 7 from either a cell 4 from an antenna 3 or a cell 6 from another antenna 5.

The mobile phone comprises a baseband device BB which permits to deliver audio signal to a user and to transmit the audio signal from the user to the RF chain as a modulated signal $S_7$, $S_8$. The mobile phone also comprises two SIM card slots adapted to receive and hold two SIM cards, called SIM A and SIM B. In the example of FIG. 2, SIM A is the master SIM card and SIM B is the slave SIM card.

The mobile phone comprises an interface, called CONFIG, which permits to configure the master/slave options of the two SIM cards and activate the dual SIM pseudo dual standby mode of the mobile phone. The configuration is realized by the transmission of configuration signals $S_5$, $S_6$.

Two embodiments of the invention are both represented on the FIG. 2, corresponding:

in a first case, to a first material configuration in which the mobile phone comprises at least two signal processing devices $SPF_A$, $SPF_B$ devices, which permit to reach some functions such as standby functions comprising a scanning function, a reading function or a decoding function;

in a second case, to a second material configuration in which the mobile phone comprises one signal processing device $SPF_C$ which permit to reach some functions such as standby functions comprising a scanning function, a reading function or a decoding function for both incoming and outgoing calls for SIM A and SIMB.

In the first case, the first signal processing device $SPF_A$ performs measurements required in the nominal state and allows handling both receptions of incoming calls, S3, S4 signals, on SIM A and SIM B thanks to the activation of the call forwarding service. The measurements made on $SPF_A$ permit to choose, for example, the cell 6 for offering the best signal.

The second signal processing device $SPF_B$ performs measurements required in the specific operation which would permit outgoing calls from $SPF_B$ device after the activation of the switch function.

The activation of signal processing device $SPF_B$ may be made by the user via the CONFIG device which permits to switch on SIM B card allowing a new network search and registration.

In the second case, the standby functions realized by the devices $SPF_A$ and $SPF_B$ of the first case can be performed by the same entity called $SPF_C$.

In this second case, the device $SPF_C$ can be configured in various ways in order to ensure standby functions for both SIM cards.

In one embodiment, these functions are performed by a Digital Signal Processor called "DSP" and the configuration is controlled by a baseband radio resource control functions. The device $SPF_C$ may be configured with various parameters.

Example signals transmitted from one component to another are represented by $S_1$, $S_2$, $S_3$, $S_4$, $S_5$, $S_6$, $S_7$, $S_8$ signals on FIG. 2. S1 and S2 represent the signals which are modulated by the RF device in emission and demodulated in reception.

In nominal state, the SIM card which is not active does not consume power and thereby permits the signal processing device to reduce its consumption since the standby functions are not active for measurements operations.

One advantage of embodiments of the invention is that the switch function is facilitated in that all measurements made by $SPF_A$ can directly be used during the registration of SIM B for specific operations in some situations as elaborated on above. Standby functions of the signal processing device $SPF_B$ are active after the registration of SIM B.

In nominal state, the slave SIM card permits to deactivate the measurements of signal processing functions $SPF_B$ but it is still reachable due to the activation of the call forwarding service.

Some embodiments of the invention take advantage of the compatibility with any kind of mobile technology such as, for example, GSM mobile or WCDMA mobile. WCDMA is the acronym of Wideband Code Division Multiple Access. Embodiments of the invention is also compliant with IS95, LTE and the CMDA2000 protocols.

Other advantages of embodiments of the invention include:
  the call forwarding function and the master/slave configuration do not limit the incoming or the outgoing calls. It means that mobile originated calls and calls received by the mobile are both compatible with the method of the invention;
  the call forward feature may be activated at the start up of the mobile;
  there is no extra infrastructure cost because of the call forwarding function and the master/slave configuration is supported by the mobile phone.
  There is no additional delay for paging.

The invention claimed is:

1. A method of operating a multiple Subscriber Identity Module (SIM) phone, the phone being connectable to at least first and second SIM applications, wherein the method comprises:
configuring the phone by:
selecting a dual standby mode with a specific master configuration of the first SIM application;
registering the second SIM application on a wireless network;
activating a call forwarding function from the second SIM application to the first SIM application;
registering the first SIM application on the wireless network;
operating the phone by:
processing standby functions of the first SIM application;
receiving any incoming call via the first SIM application; and
handling requests for outgoing calls from the first SIM application.

2. The method according to claim 1, wherein the phone is configured to implement a dual SIM dual connection mode allowing the configuration of the first SIM application as a master application and the second SIM application as a slave application.

3. The method according to claim 1, wherein the phone is configured to implement a dual SIM dual standby mode allowing the configuration of the first SIM application as a master application and the second SIM application as a slave application.

4. The method according claim 1, further comprising:
handling a request for an outgoing call from the second SIM application by:
switching operations from the first SIM application to the second SIM application; and
automatically switching back operations from the second SIM application to the first SIM application at the end of the outgoing call from the second SIM application.

5. The method according to claim 4, wherein the request for an outgoing call from the second SIM application is initiated by a user activation on a phone interface.

6. The method of claim 4, wherein the switching operations from the first SIM application to the second SIM application comprises establishing a dedicated connection for the outgoing call from the second SIM application.

7. The method according to claim 1, wherein the first step of selection of the dual standby mode with a specific master configuration of the first SIM application automatically declare the second SIM application as a slave.

8. The method according to claim 1, wherein the at least first and second SIM applications comprises at least first and second SIM cards and wherein the phone is connectable to the at least first and second SIM cards by comprising at least a first and second SIM card slot configured to hold the first and second SIM card respectively.

9. The method according to claim 1, wherein standby functions of the second SIM application are not processed during the specific master configuration of the first SIM application.

10. The method of claim 1, wherein the call forwarding function from the second SIM application to the first SIM application comprises layer 3 messaging.

11. The method according claim 1, further comprising:
handling a request for an outgoing call from the second SIM application by:
switching operations from the first SIM application to the second SIM application.

12. A computer program product comprising a computer readable medium, having thereon a computer program comprising program instructions, the computer program being loadable into a data-processing unit and configured to cause the data-processing unit to, when the computer program is run by the data-processing unit, execute any of the steps of a method of operating a multiple subscriber identity module (SIM) phone, the phone being connectable to at least first and second SIM application, the method comprising:
selecting a dual standby mode with a specific master configuration of the first SIM application;
registering the second SIM application on a wireless network;
activating a call forwarding function from the second SIM application to the first SIM application;
registering the first SIM application on the wireless network;
operating the phone by:
processing standby functions of the first SIM application;
receiving any incoming call via the first SIM application; and
handling requests for outgoing calls from the first SIM application.

* * * * *